A. JAKOVLEFF.
VEHICLE WHEEL.
APPLICATION FILED JAN. 24, 1918.

1,343,567.

Patented June 15, 1920.

WITNESS

INVENTOR.
Alexis Jakovleff,
BY
Strong & Townsend
ATTORNEYS

UNITED STATES PATENT OFFICE.

ALEXIS JAKOVLEFF, OF SAN FRANCISCO, CALIFORNIA, ASSIGNOR TO JAK TIRE CORPORATION, OF SAN FRANCISCO, CALIFORNIA, A CORPORATION OF CALIFORNIA.

VEHICLE-WHEEL.

1,343,567.

Specification of Letters Patent. Patented June 15, 1920.

Application filed January 24, 1918. Serial No. 213,458.

*To all whom it may concern:*

Be it known that I, ALEXIS JAKOVLEFF, a citizen of Russia, residing at the city and county of San Francisco and State of California, have invented new and useful Improvements in Vehicle-Wheels, of which the following is a specification.

This invention relates to vehicle wheels, and is especially applicable to the construction of automobile and auto truck wheels, in which it is desirable to provide a strong and elastic bearing wheel suitable for the load to be borne.

As illustrated in the drawings it comprises a central hub, a surrounding disklike structure with an inclosing band about which is the tire, consisting of a two-part, circumferentially divided casing and an inner elastic air-containing tube. The inner meeting edges of the casing sections are provided with flanges which fit between and are locked in place by clamping rings secured to the central disk structure, and the outer peripheries of the sections are similarly locked together and to an exterior rigid rim which forms the wheel tread. The meeting edges of the sections are beveled and are supported by a beveled ring bolted to the inner disk and the surrounding rim.

Referring to the accompanying drawings for a more complete explanation of the invention—

Figure 1:
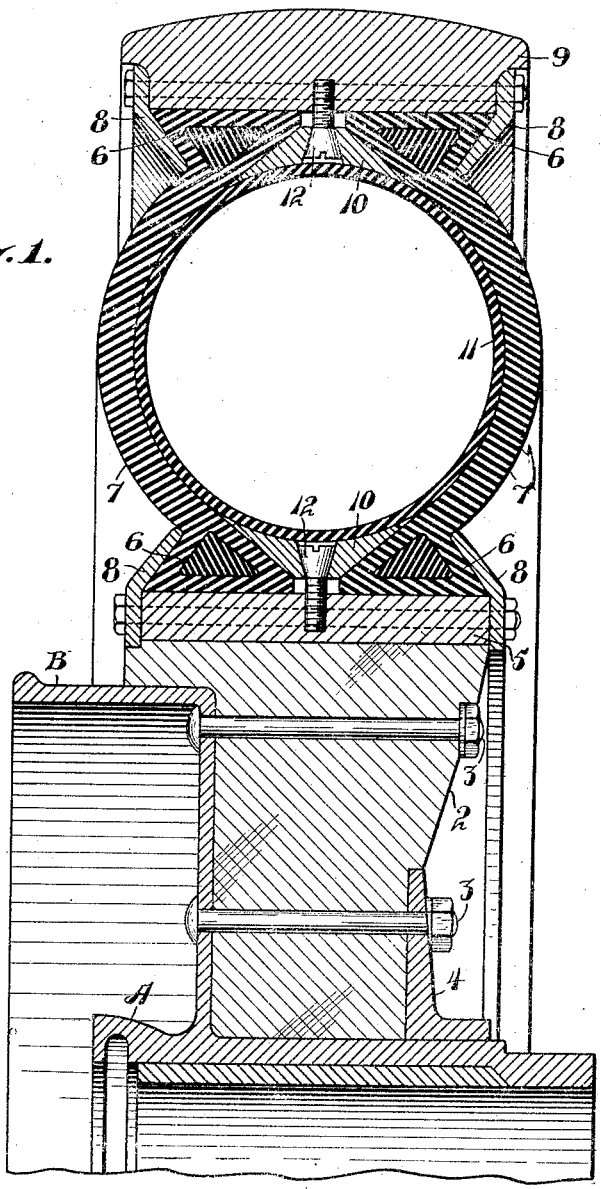
Figure 1 is a section taken through the wheel and transversely of the tube and accessories.
Figure 2:
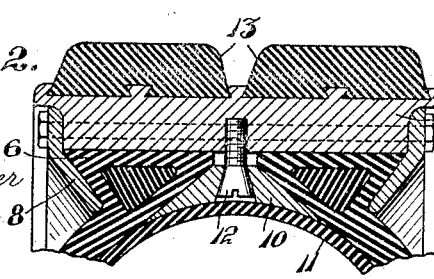
Fig. 2 is a section showing an elastic tread outside of the rigid shoe.

As shown in the present construction, A is the hub of a wheel, having an annular flange B surrounding its outer end. Abutting against this flange is a disk 2 which may be composed of solid sections of wood or an equivalent material, secured to the flange B by bolts 3. A flanged disk 4 surrounds the inner end of the hub, and the bolts nearest to the hub pass through the flange B and the disk 4 and thus secure this portion of the wheel rigidly in place.

Around the outer periphery of this support 2 is fitted an inner rim 5 which serves as a base upon which the inner flanges 6 of the elastic tire casing 7 are supported, together with the annular holding clamps 8 which are bolted through the inner rim 5 and have inwardly bent flanges which engage the correspondingly shaped flanges 6 of the casings and thus secure them firmly to the inner rim and its support. The casing 7 is made of flexible, fibrous material combined with rubber or other elastic material. This casing is in two abutting complementary sections each having similar flanges 6 at their opposite edges and each contiguous flange being secured by a similar clamp 8. The outermost or peripheral clamps are bolted to the edges of an outer tread shoe 9 which is made of suitable material to resist frictional wear in contact with the ground.

The edges of the casing sections are made thinner than the main body, and are engaged by a ring 10, the latter having its inner circumference curved transversely to coincide with the curvature of the interior of the casing sections forming the casings, and thus completes the circular form within which the flexible, elastic, air-containing inner tube 11 fits when expanded by interior air pressure.

The opposite sides of the ring 10 are perforated to receive bolts 12, by which the ring is secured to the inner rim 5 and to the outer ground shoe 9, thus holding all parts of the wheel in a coacting structure having a maximum resistance to side thrust and twist and equalizing the compression and form of the tire casing. The unequal compression occurs as different portions of the tread shoe are brought successively into contact with the ground and these pass around to the upper portion as the wheel revolves.

By constructing the tire casings in two independent halves repairs or changes are rapidly and correctly effected. The connections between the inner ring 10 and the inner rim 5 and tread shoe 9 prevent side thrust and distortion of the casing elements when subjected to transverse thrust and strain.

In operation, the wheel is assembled as follows: The inner rim 5 is placed on its support and the tire sections 7 are placed thereon; the retaining rings 8 and central wedge ring 10 being applied and suitably tightened. The outside tread rim 9 is next applied; its wedge ring 10 being attached thereto and so adjusted as to form a proper continuation of the curvature of the inside of the casing and to receive the corresponding wedge-shaped edges of the casing, it being understood that the complementary angular spaces formed between the tread ring 9 and its inside wedge ring 10 constitute pockets for the reception of the corresponding edges of the casing sections, which pockets or seats coöperate with the outer retaining rings 8 to hold the casing in place. Similarly the same thing applies to the inside rim 5 and its complementary wedge ring 10.

Having thus described my invention, what I claim and desire to secure by Letters Patent is—

In a vehicle wheel, a central annular support, a relatively thick inner rim mounted over the support and having radial screw holes and axial bolt holes spaced from the screw holes, a casing divided circumferentially into two complementary sections having inner and outer flanges, the inner flanges seating on the inner rim, a tread rim having radial screw holes and axial bolt holes spaced from the screw holes, retaining rings on each side of each rim for clamping the corresponding casing flanges to the rims, screws passed through the respective screw holes and engaged with the rings for securing the latter in place, clamps at each side of each rim engaged with the respective casing flanges and bolts extending through the bolt holes and engaged with the clamps to hold the latter in place, the radial screws having their threaded ends terminating interiorly of the respective rims and the clamps of the inner rim extending across the joint between the inner rim and support and engaged with opposite side faces of the latter, the inner rim carrying all of the enumerated parts excepting the support.

In testimony whereof I have hereunto set my hand in the presence of two subscribing witnesses.

ALEXIS JAKOVLEFF.

Witnesses:
H. VAN HEIS,
GEO. H. STRONG.